Jan. 18, 1944.  A. A. ASHTON  2,339,450
HYDROMATIC BRAKE ARRANGEMENT
Filed Jan. 5, 1942   2 Sheets-Sheet 1
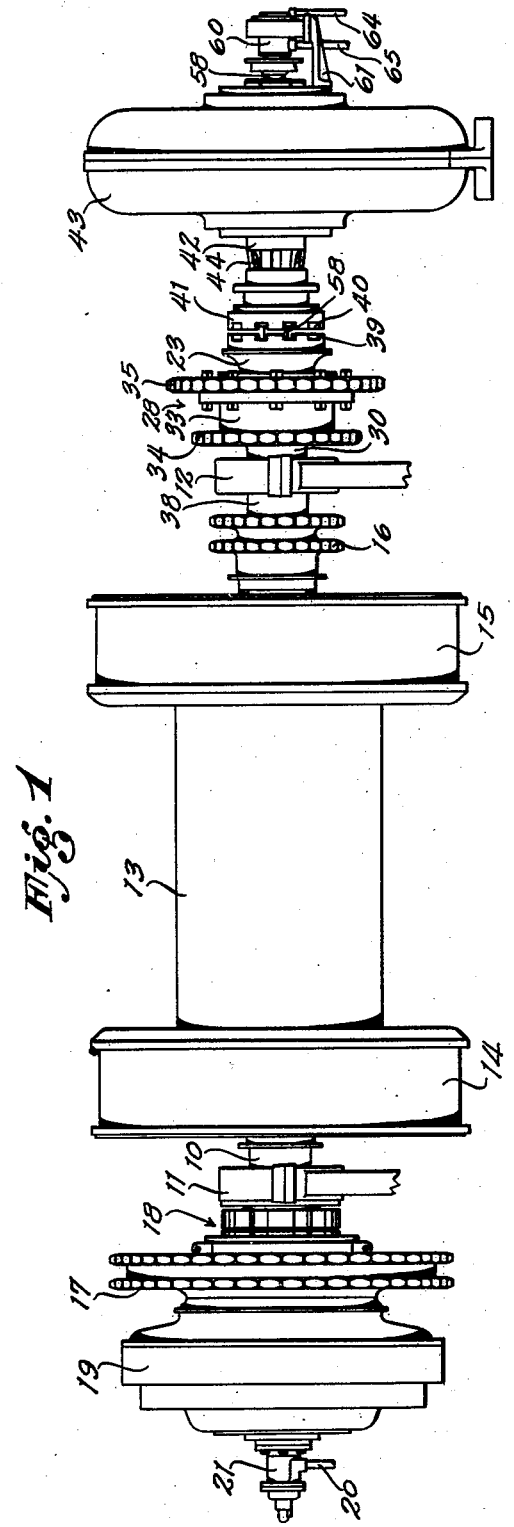
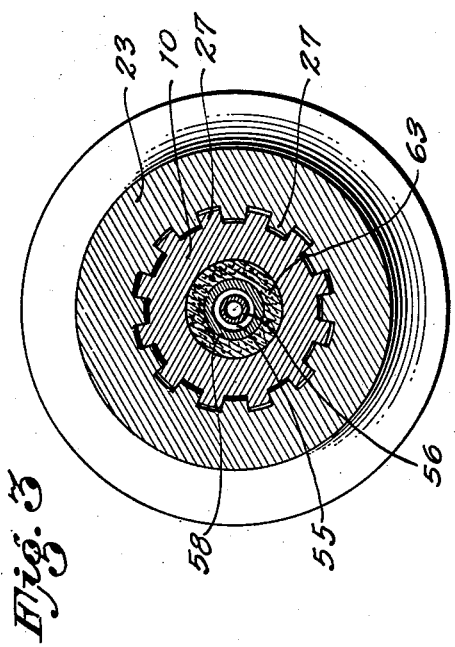
Inventor,
ALBERT A. ASHTON
By
Attorney
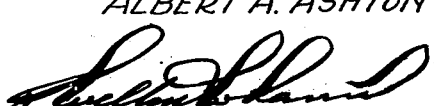

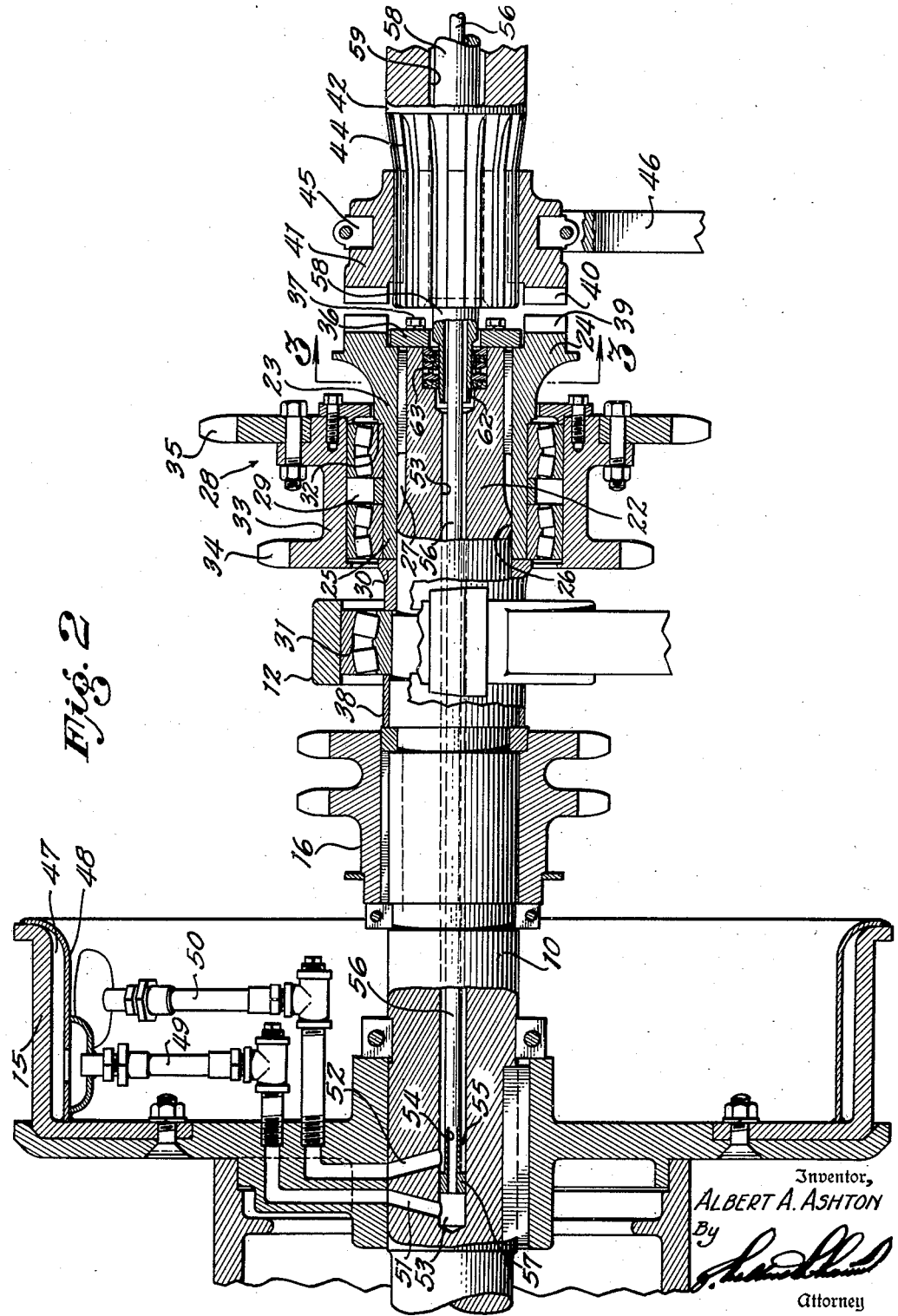

Patented Jan. 18, 1944

2,339,450

UNITED STATES PATENT OFFICE 2,339,450

HYDROMATIC BRAKE ARRANGEMENT

Albert A. Ashton, Los Angeles, Calif., assignor to Emsco Derrick & Equipment Company, Los Angeles, Calif., a corporation of California Application January 5, 1942, Serial No. 425,647

1 Claim. (Cl. 254—187)

My invention relates to drawworks of the type used in well drilling equipment, and relates in particular to hoisting apparatus having means whereby a fluid brake or power absorber may be advantageously employed.

Hoisting apparatus of the type to which this invention relates is subjected to severe service when used in the drilling of deep wells. In addition to the employment of water cooled band type friction brakes for controlling rotation of the drum, it is desirable to use in this equipment an auxiliary or supplementary fluid actuated power absorbing device referred to in the art as a hydromatic brake, which is connected to the drum shaft during the operation of running a string of pipe into the hole.

An object of the invention is to provide cooperating parts whereby the hydromatic brakes may be short coupled to the drum shaft, to minimize the overhang of the drum shaft beyond its supporting bearing and to make possible the addition of a hydromatic brake to a drawworks without material increase in the overall length of the drawworks and without the necessity of eliminating from the drum shaft assembly of the drawworks any part necessary for complete service. This last desirable result I accomplish in part by mounting the clutch of the hydromatic brake within a customary or desired part of the drum shaft assembly. One example of this expedient will be perceived from the following. For transmission of power from the drawworks to the rotary machine, it is a custom to mount an idler sprocket assembly on the far end of the drum shaft, this idler sprocket assembly comprising a pair of rigidly connected sprockets, one of which is driven by a chain from the line shaft of the drawworks and the other of which engages the chain which extends to the sprocket on the rotary machine. To avoid extending the drum shaft beyond this idler sprocket so as to provide a shaft portion to which the clutch for the hydromatic brake may be connected, I mount a part of this clutch on the portion of the shaft lying within the idler sprocket and support the idler sprocket on this clutch part by means of bearings.

Among the advantages derived from the invention is to enable the making of a large size drawworks coming reasonably within the special limits of the floor of the derrick, to avoid great increase in the weight and reenforcement of the base or frame of the drawworks, and to support the hydromatic brake in such relation to the drum shaft that when desired the hydromatic brake may be removed from its operative position in a direction transverse to the axis of the drum shaft.

Further objects and advantages of the invention will appear in the following part of the specification.

Referring to the drawings, which are for illustrative purposes only,

Fig. 1 is an elevational view of a drum shaft assembly of a type adapted for heavy duty service.

Fig. 2 is a sectional view taken on a vertical plane of the rightward portion of the drum shaft assembly, and showing also the hydromatic brake shaft.

Fig. 3 is a cross section taken as indicated by the line 3—3 of Fig. 2.

The drum shaft assembly shown in Fig. 1 includes a drum shaft 10 supported by spaced bearings 11 and 12. A cable drum 13 is fixed on the shaft between the bearings 11 and 12, and brake drums 14 and 15 are supported by the flanges of the cable drum 13. Means are provided for driving the drum 13 at two different speeds, one of these means comprising a relatively small sprocket 16 fixed on the shaft between the drum 13 and the bearing 12. The other drive means for the drum 13 comprises a sprocket 17 rotatable upon that portion of the shaft 10 which projects leftward from the bearing 11 and arranged for driving connection with the shaft through a jaw clutch 18 or a friction clutch 19, which is actuated by fluid under pressure delivered through a delivery pipe 20 and a swivel connection 21.

As shown in Fig. 2, the rightward end of the shaft 10 comprises a shaft portion 22 which projects beyond the bearing 12. A clutch member 23 is mounted on this projecting shaft portion 22. The clutch member 23 is shown with an annular head or body 24 and a leftwardly extending cylindrical portion 25, there being a bore 26 axially through the clutch member 23 to fit the extending shaft portion 22. Driving engagement between the clutch member 23 and the shaft portion 22 comprises interengaging splines 27 on the shaft and in the bore of the clutch member 23.

An idler sprocket assembly 28 is mounted on the clutch member 23 by means of a dual bearing assembly 29 comprising roller bearings having their inner races in engagement with the cylindric extension 24 of the clutch member 23. The bearing assembly 29 is held in position on the clutch member 23 by a collar 30 which acts also as a spacer between the leftward end of the clutch member 23 and the inner race 31 of the shaft bearing 12, the clutch member 23 having a shoulder 32 at the rightward end of the bearing assembly 29 for limiting rightward movement of the idler sprocket assembly 28 relative to the clutch member 23 which is fixed on the end portion 22 of the drum shaft. The idler sprocket assembly 28 includes a cylindric wall 33 with sprockets 34 and 35 thereon. An annular keeper ring 36, secured to the rightward end of the drum shaft 10 by screws 37, holds the sprocket 16, spacer ring 38, inner bearing race 31, collar 30, and clutch member 23 on the shaft.

The clutch member 23 has engaging means 39 shown as axially directed jaws or teeth for engaging cooperating jaws or teeth 40 of a sliding clutch member 41 mounted on the shaft 42 of a hydromatic brake 43. The clutch member 41 and the shaft 42 have interengaging splines 44, and this clutch member 41 is movable from the position in which it is shown into engagement with the clutch member 23 in the customary manner employing a conventional clutch shifting ring 45 and a shifting yoke 46.

To illustrate the manner in which the brake drums are cooled, I have shown an annular water chamber 47 formed by an annular wall 48 within the brake drum 15. Cooling water is fed into and taken from this annular passage 47 through inlet and outlet water ducts 49 and 50 which respectively communicate with axially spaced radial passages 51 and 52 in the drum shaft 10. The inner ends of the radial passages 51 and 52 communicate with spaced points in an axial opening 53 which extends in from the rightward end of the shaft 10 and has therein inlet and outlet passages 54 and 55 formed by an inserted tube 56 having a head 57 on its inner end positioned between the inner ends of the radial passages 51 and 52. The tube 56 extends also within a sleeve 58 which projects through a bore 59 formed axially through the shaft 42 of the hydromatic brake 43. The rightward or outer end of the sleeve 58 is supported by a swivel connection 60 which is in turn supported by bracket 61 carried by the hydromatic brake 43. The sleeve 58 has an inner reduced end 62 which projects into a counterbore formed in the rightward end of the axial opening 53 of the drum shaft and is engaged by sealing means 63 carried in this counterbore, so that the space within the sleeve 58 around the tube 56 will constitute a continuation or part of the outlet passage 55 communicating with the swivel connection 60 to which inlet and outlet water pipes 64 and 65 are connected.

I claim as my invention:

In a hoisting device or drawworks, the combination of: a drum mounted on a drum shaft for rotation therewith; bearing means rotatably supporting the drum shaft and positioned so that said drum shaft has a projecting end; drive means on the shaft operative to rotate the shaft and drum; a fluid brake having a brake shaft in axial alignment with said projecting end of said drum shaft; a clutch part rotatable with said drum shaft comprising a tubular sleeve having an axial bore receiving said projecting end of said drum shaft and a clutch face on the outer end of said tubular sleeve, the exterior surface of said tubular sleeve forming a bearing surface; an idler sprocket assembly rotatably mounted on said bearing surface in axially spaced relationship to said clutch face; a second clutch part connected to and axially movable on said brake shaft, said second clutch part having a clutch face on the outer end thereof for direct end-to-end clutching engagement with said clutch face on said first clutch part.

ALBERT A. ASHTON.